United States Patent
Staffaroni et al.

(10) Patent No.: US 10,332,553 B1
(45) Date of Patent: Jun. 25, 2019

(54) DOUBLE RIDGE NEAR-FIELD TRANSDUCERS

(71) Applicant: Headway Technologies, Inc., Milpitas, CA (US)

(72) Inventors: Matteo Staffaroni, San Ramon, CA (US); Koji Shimazawa, Cupertino, CA (US); Tobias Maletzky, San Jose, CA (US); Xuhui Jin, Sunnyvale, CA (US); Yoshihiro Tsuchiya, Tokyo (JP); Tsutomu Chou, Tokyo (JP)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 15/857,847

(22) Filed: Dec. 29, 2017

(51) Int. Cl.
*G11B 5/31* (2006.01)
*G11B 5/60* (2006.01)
*G11B 5/48* (2006.01)
*G11B 5/00* (2006.01)

(52) U.S. Cl.
CPC .......... *G11B 5/6082* (2013.01); *G11B 5/314* (2013.01); *G11B 5/3133* (2013.01); *G11B 5/3163* (2013.01); *G11B 5/4866* (2013.01); *G11B 5/6088* (2013.01); *G11B 2005/0021* (2013.01)

(58) Field of Classification Search
CPC ..... G11B 5/3133; G11B 5/314; G11B 5/3163; G11B 5/6088
USPC .......................................... 360/125.3, 125.31
See application file for complete search history.

(56) References Cited

U.S. PATENT DOCUMENTS

| | | |
|---|---|---|
| 6,999,384 B2 | 2/2006 | Stancil et al. |
| 7,272,102 B2 | 9/2007 | Challener |
| 7,786,946 B2 | 8/2010 | Diaz et al. |
| 8,000,178 B2 | 8/2011 | Shimazawa et al. |
| 8,036,069 B1 | 10/2011 | Jin et al. |
| 8,295,132 B2 | 10/2012 | Jin et al. |
| 8,351,307 B1 | 1/2013 | Wolf et al. |
| 8,391,108 B2 | 3/2013 | Peng et al. |
| 8,488,419 B1 | 7/2013 | Jin et al. |
| 8,587,492 B2 | 11/2013 | Runyon |
| 8,599,656 B2 | 12/2013 | Jin et al. |
| 8,630,153 B1 | 1/2014 | Wang et al. |
| 8,691,102 B1 | 4/2014 | Araki et al. |

(Continued)

OTHER PUBLICATIONS

Co-pending U.S. Pat. No. HT16-003, U.S. Appl. No. 15/285,721, filed Oct. 5, 2016, by Matteo Staffaroni et al., "Optical Shield System for Improved Near-Field Transducer (NFT) Performance," 35 pgs.

(Continued)

*Primary Examiner* — Jefferson A Evans
(74) *Attorney, Agent, or Firm* — Saile Ackerman LLC; Stephen B. Ackerman

(57) ABSTRACT

A TAMR (thermally assisted magnetic recording) write head uses a gap-based NFT (near-field transducer) to create plasmon near field energy. In one embodiment the NFT is a double ridge aperture structure that simultaneously delivers low transition curvature and better cross-track thermal gradients than previous designs. In another embodiment a NFT comprises a top and bottom ridge not confined to an aperture structure, made of thermo-mechanically stable materials and a parabolic shaped metal layer disposed adjacent to a dielectric waveguide core to couple optical energy to surface plasmon modes.

29 Claims, 13 Drawing Sheets

(56) References Cited

U.S. PATENT DOCUMENTS

| | | |
|---|---|---|
| 8,773,803 B2 | 7/2014 | Jin et al. |
| 8,804,468 B2 | 8/2014 | Zhao et al. |
| 8,811,128 B1* | 8/2014 | Seigler .................. G11B 5/314 |
| | | 369/112.27 |
| 8,861,318 B1 | 10/2014 | Lee et al. |
| 8,953,272 B2 | 2/2015 | Peng et al. |
| 8,953,421 B2 | 2/2015 | Peng et al. |
| 8,988,827 B1* | 3/2015 | Balamane .............. G11B 5/314 |
| | | 360/125.31 |
| 9,019,803 B1 | 4/2015 | Jin et al. |
| 9,025,422 B2 | 5/2015 | Aoki et al. |
| 9,042,209 B2 | 5/2015 | Balamane et al. |
| 9,053,717 B1 | 6/2015 | Matsumoto et al. |
| 9,064,515 B2 | 6/2015 | Zhao et al. |
| 9,099,112 B1 | 8/2015 | Balamane et al. |
| 9,129,620 B2 | 9/2015 | Cheng et al. |
| 9,281,003 B2* | 3/2016 | Zhao ...................... G11B 5/314 |
| 9,437,646 B2 | 9/2016 | Sekiguchi et al. |
| 9,466,320 B1 | 10/2016 | Staffaroni et al. |
| 9,484,051 B1* | 11/2016 | Krichevsky .......... G11B 5/3133 |
| 9,852,748 B1* | 12/2017 | Sahoo .................. G11B 5/3106 |
| 9,852,752 B1 | 12/2017 | Chou et al. |
| 9,953,670 B1* | 4/2018 | Mu ....................... G11B 5/4866 |
| 2012/0092971 A1 | 4/2012 | Schreck et al. |
| 2013/0170332 A1* | 7/2013 | Gao ....................... G11B 5/314 |
| | | 369/13.33 |
| 2014/0269233 A1* | 9/2014 | Hara ...................... G11B 5/314 |
| | | 369/13.17 |
| 2015/0255097 A1 | 9/2015 | Zhao et al. |
| 2016/0300592 A1* | 10/2016 | Kawakami ............ G11B 5/314 |
| 2016/0351211 A1* | 12/2016 | Blaber .................. G11B 5/314 |
| 2017/0287511 A1* | 10/2017 | Rajauria ................ G11B 5/314 |
| 2018/0059025 A1* | 3/2018 | Jiang .................... G01N 21/658 |

OTHER PUBLICATIONS

Co-pending U.S. Pat. No. HT15-024, U.S. Appl. No. 15/011,892, filed Feb. 1, 2016, "Self-Aligned Hybrid Au-Rh Near Field Transducer for Enhanced Reliability," by Matteo Staffaroni et al., 44 pgs.

* cited by examiner

| | Peg/Ridge material | Down-track thermal gradient [K/nm] | Cross-track thermal gradient [K/nm] | Peg/Ridge temperature rise [K] | Bit integrity [%] |
|---|---|---|---|---|---|
| Present peg-based NFT | Rh | 6.3 | 6.5 | 256 | 63 |
| Cap-based NFT (HT16-21) | Rh | 8.5 | 5.3 | 102 | 79 |
| New Cap-based NFT (This invention) | Rh | 9.9 | 9.1 | 113 | 78 |
FIG. 1
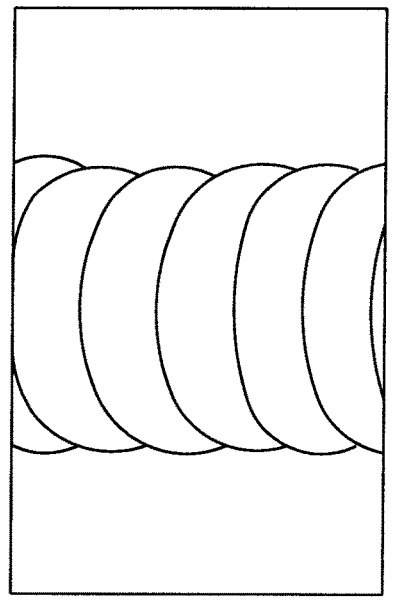
FIG. 2b
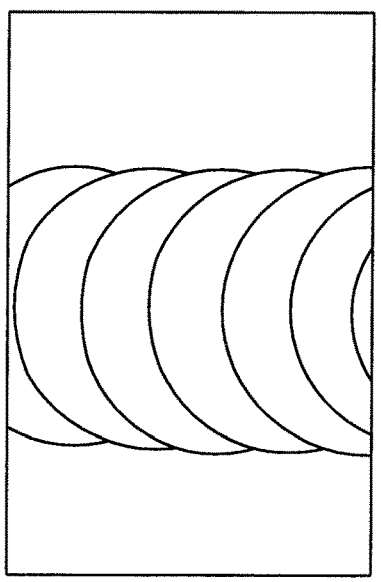
FIG. 2a

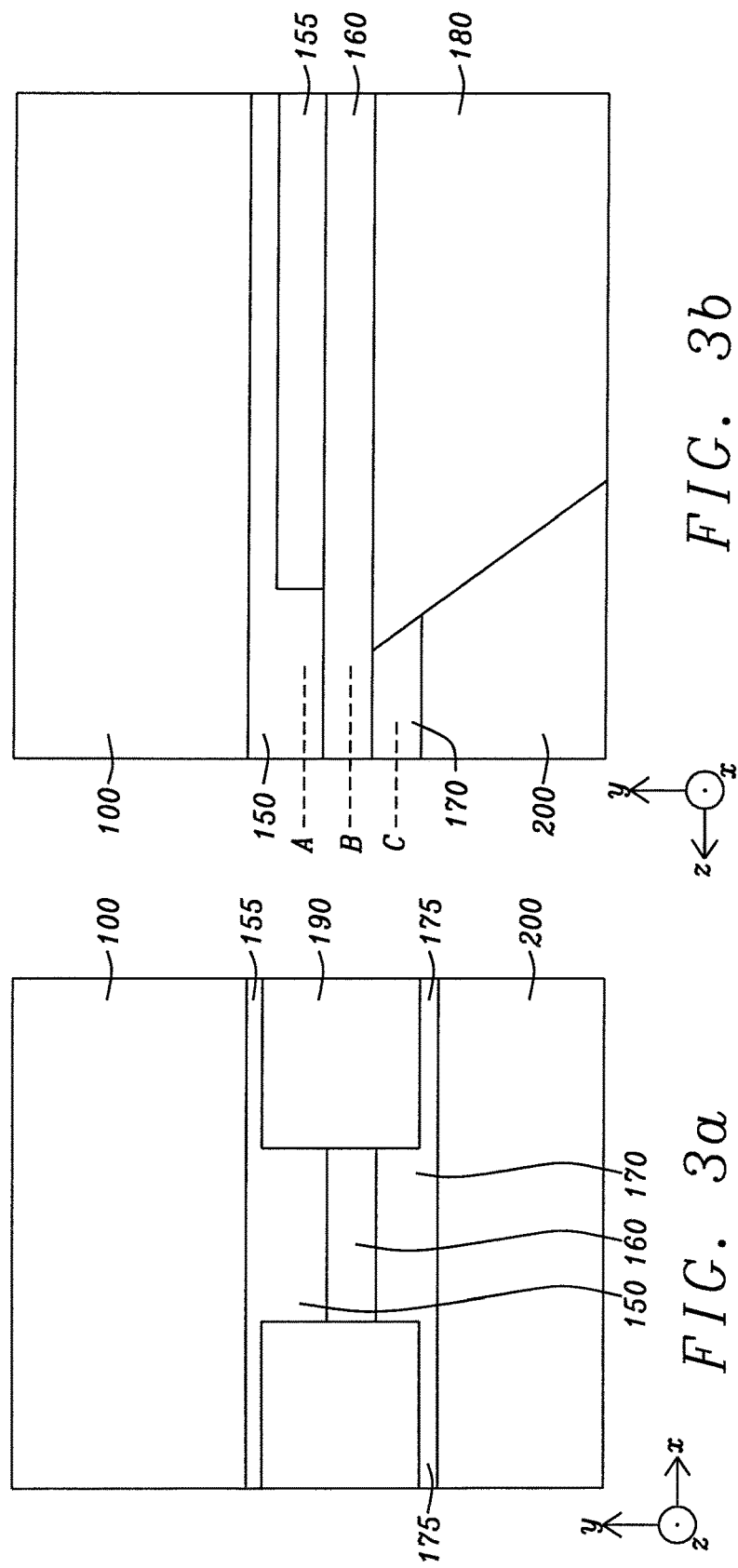

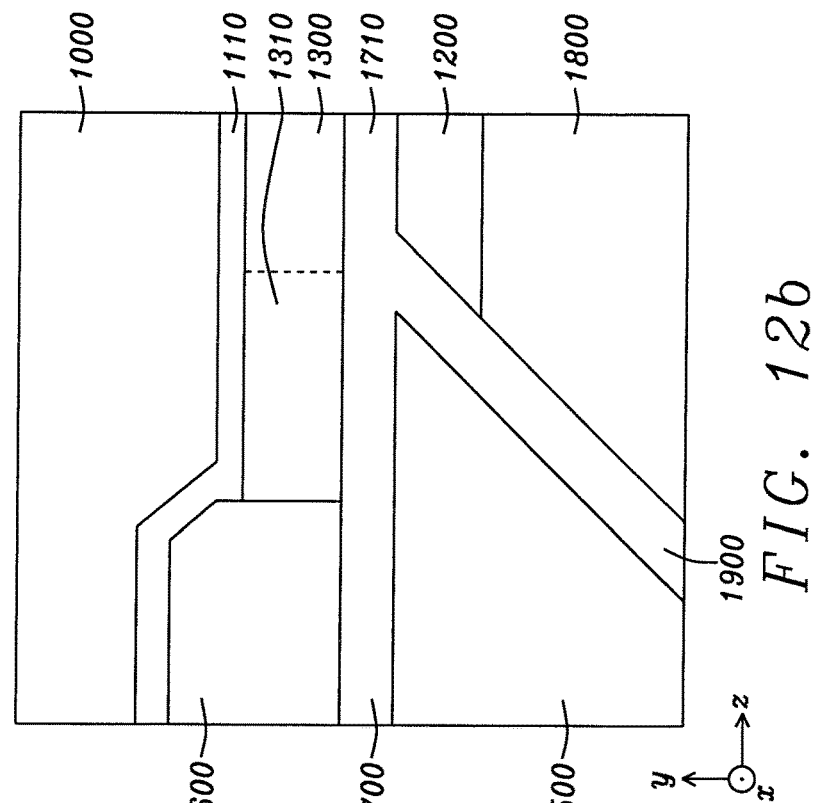
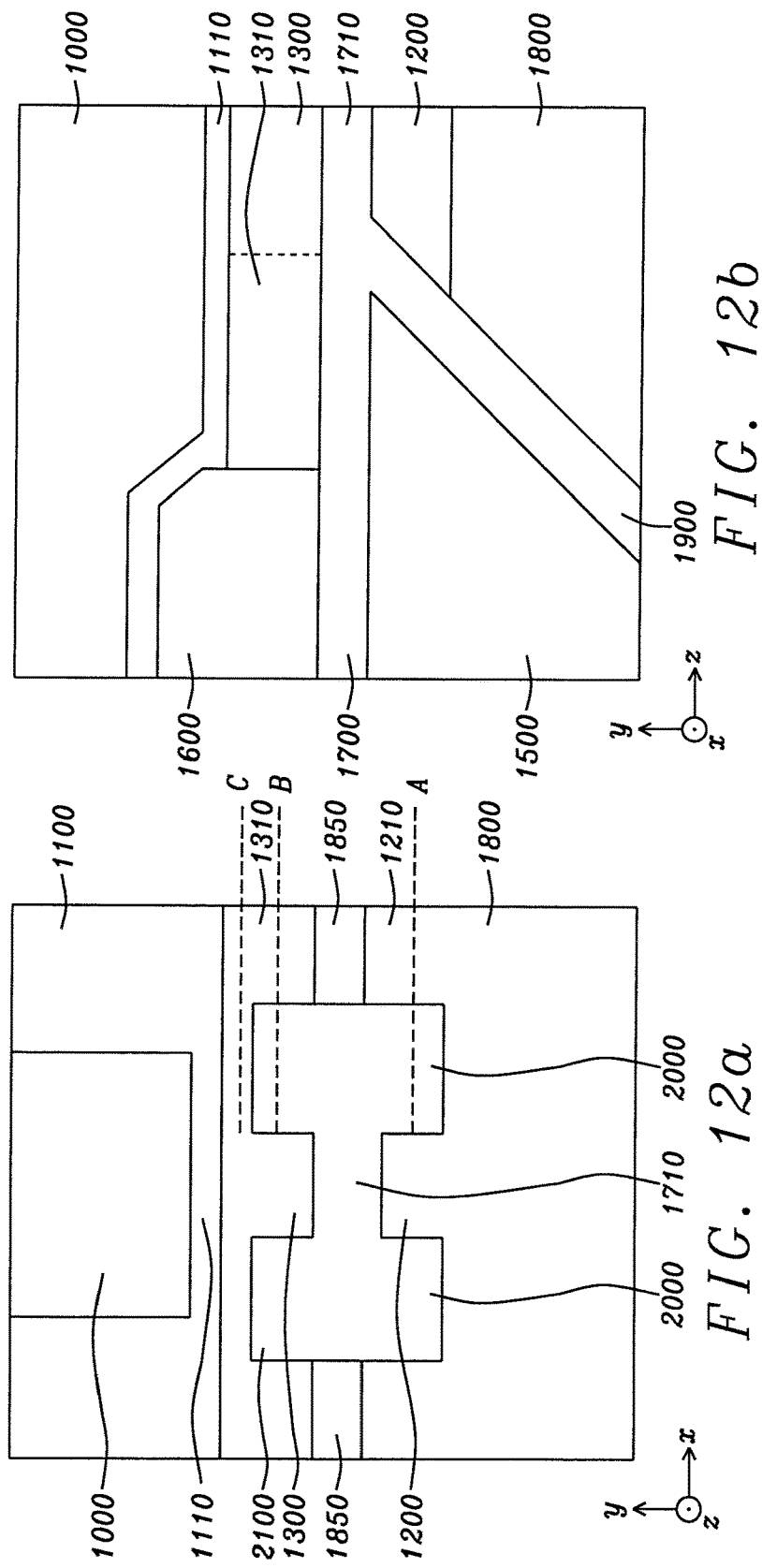

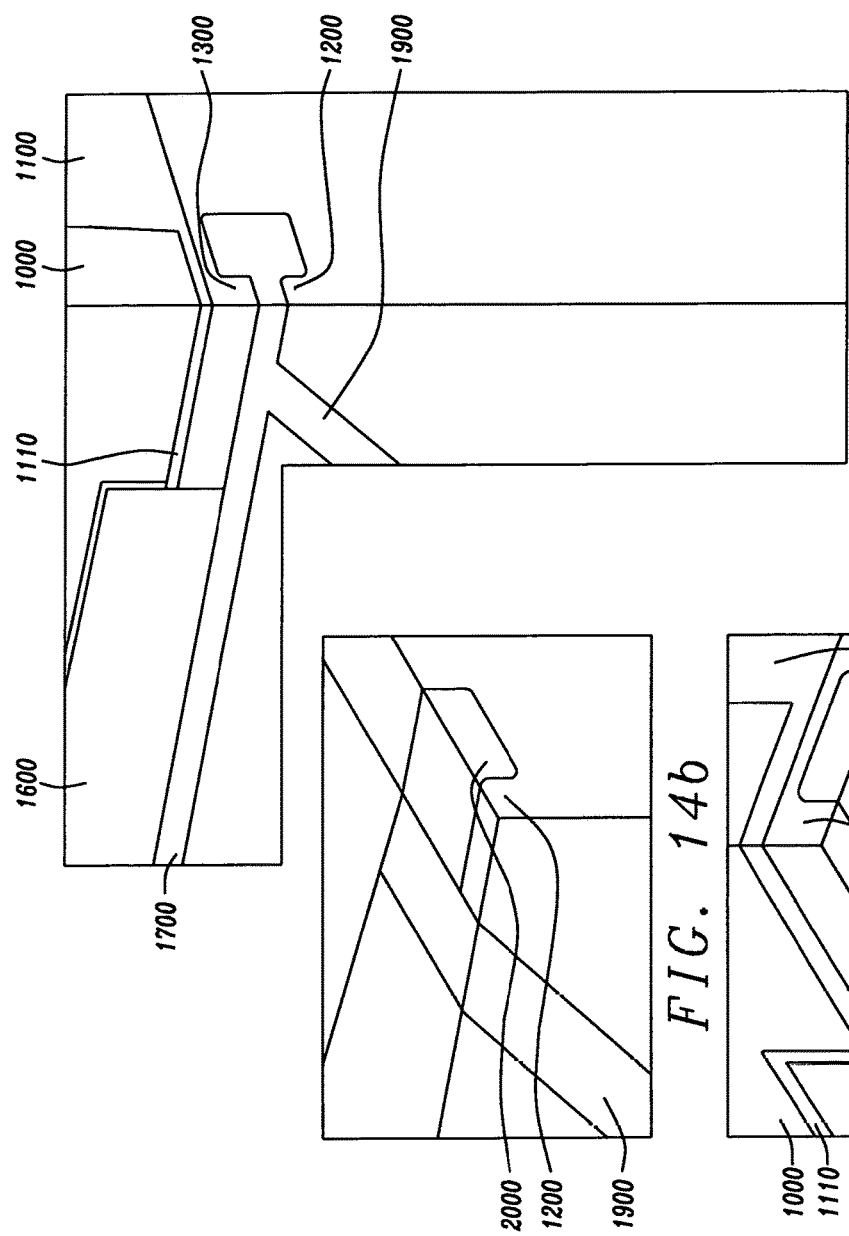

DOUBLE RIDGE NEAR-FIELD TRANSDUCERS

This Application is related to Ser. No. 15/235,171 Filing Date: Aug. 12, 2016, to Ser. No. 15/011,892, Filing Date: Feb. 1, 2016; to Ser. No. 15/285,721, Filing Date: Oct. 5, 2016 and to Ser. No. 15/686,471, Filing Date: Aug. 25, 2017, each assigned to a common assignee and incorporated herein by reference.

BACKGROUND

1. Technical Field

This disclosure relates to magnetic write heads that write on magnetic recording media, particularly to write heads that use Thermally Assisted Magnetic Recording (TAMR) enabled by the absorption of plasmon near-field energy from a near-field transducer.

2. Description

In general, a magnetic recording medium, on a microscopic level of composition, is a discontinuous body in which fine magnetic particles are assembled and held in place in a matrix. Each of these fine magnetic particles has a single magnetic-domain structure, so one recording bit is actually formed by a plurality of neighboring particles. In order to enhance the recording density, therefore, it is necessary to make the magnetic particles smaller in size so as to reduce irregularities at the boundaries of the bits. As the particles are made smaller, however, their volume decreases, so that the thermal stability of the magnetization may deteriorate. This causes a problem.

An index of the thermal stability in magnetization is given by $K_U V/k_B T$. Here, $K_U$ is the magnetic anisotropy energy of a magnetic fine particle, V is the volume of one magnetic fine particle, $k_B$ is the Boltzmann constant, and T is the absolute temperature. Making the magnetic fine particles smaller just reduces V, which lowers $K_U V/k_B T$ and thereby worsens the thermal stability. Though $K_U$ may be made greater at the same time as a measure to reduce this problem, the increase in $K_U$ also increases the coercivity of the magnetic recording medium. However, the writing magnetic field intensity produced by a magnetic head is substantially determined by the saturated magnetic flux density of the soft magnetic material constituting a magnetic pole within the head. Therefore, there can be no writing if the coercivity exceeds a permissible value determined by the limit of writing magnetic field intensity.

One method proposed for solving such a problem affecting the thermal stability of magnetization is the what is called a thermally assisted (or activated) magnetic recording (TAMR) scheme. In this approach, heat is applied locally to a magnetic recording medium immediately before applying a writing magnetic field, particularly when using a magnetic material having a large value of $K_U$. The heat then effectively lowers the medium's coercivity at the same position where the magnetic writing field is to be applied, so as to enable writing in that region as though the entire medium had a generally lowered coercivity. This approach is expected to ultimately enable recording densities at between approximately 1 and 10 Tb/inch².

In the thermally assisted magnetic head recording apparatus, a light (optical radiation) source, such as a semiconductor laser diode, is typically used as the source of thermal energy. Light from such a light-emitting device is introduced into an optical waveguide, typically having a dielectric core, configured to propagate the light. As waveguide core material, TaOx or SiON is typically used. The waveguide is surrounded with cladding material, typically Al2O3, SiON or SiO2. The combination supports modes of electromagnetic radiation. The waveguide-propagated electromagnetic radiation is transferred, by electromagnetic coupling, to a near-field transducer (NFT) adjacent to (above or below) the waveguide at the distal end of the waveguide. Here the waveguide excites a resonant mode of the NFT which is supported by a large volume of the NFT, which will be referred to as the NFT resonator body. The focusing of the optical power to a small region of the magnetic recording medium is accomplished by a "pcg" feature (hereafter referred to as the NFT peg) located at the distal end of the NFT adjacent to the air bearing surface (ABS) of the head.

TAMR is about to enter a new product cycle where recording media will be characterized by a linear density of about 2500kFCI and 500kTPI, respectively, corresponding to a track pitch of 51 nm and a 1T bit length of 10 nm. In order to maintain sufficient signal-to-noise ratio at such small bit-lengths, a large effective down-track thermal gradient produced by the NFT is insufficient; it is also necessary to guarantee that the transition curvature at the leading edge of the recording bubble is minimized. In addition, a large cross-track thermal gradient is desirable in order to minimize adjacent track erasures. Present peg-based NFTs provide large down-track and cross-track thermal gradients, but they suffer from poor transition curvature at small track pitches. On the other hand, gap-based NFTs have been proposed as a means of improving transition curvature as in Headway Application, which is fully incorporated herein by reference, but such an approach has, so far, suffered from a large reduction in cross-track thermal gradients as compared to its peg-based counterparts. Other attempts to deal with the issues discussed above have also been found in prior art such as Sekiguchi et al. (U.S. Pat. No. 9,437,646), Diaz et al. (U.S. Pat. No. 7,786,946), Runyon (U.S. Pat. No. 8,587,492), Peng et al. (U.S. Pat. No. 8,953,272), Wolf et al. (U.S. Pat. No. 8,351,307), and Peng et al. (U.S. Pat. No. 8,391,108), but these attempts do not provide the scope or effectiveness of the present disclosure. Therefore, there remains a need for an NFT design that delivers both low transition curvature and large thermal gradients, both down-track and cross-track. In addition, any new design should meet or improve on the power requirement and projected temperature rise of existing or recently proposed designs.

SUMMARY

A first object of this disclosure is to provide a TAMR write head having a gap-based NFT employing a double ridge design that provides better transition curvature and a larger down-track thermal gradient than current peg-based NFTs while also providing cross-track and down-track thermal gradients that are significantly better than those of other known NFT designs that provide low transition curvature.

A second object of this disclosure is to provide such a TAMR head with a gap-based, double ridge NFT design whose performance is at least comparable to prior art TAMR heads yet whose NFT has critical portions that are entirely comprised of thermo-mechanically stable metals, such as Ir and Rh.

A third object of this disclosure is to provide such a TAMR head with a gap-based double ridge NFT design where the temperature rise of the NFT portion will be on a par with that of other recently-proposed gap-based NFT designs which, in turn, are expected to show lower temperature rise than current peg-based NFTs.

A fourth object of this disclosure is to provide such a TAMR head with a gap-based double ridge NFT design that does not require an optical aperture feature (although one may be used), thereby creating a less complicated fabrication process that, for example, eliminates the need for backend techniques to enable the creation of optical openings in the ABS.

The present disclosure, in one of its embodiments, provides a primarily Rh-based near-field transducer (NFT) that may be thought of as the optical-frequency analog of a microwave double-ridge waveguide. It is capable of simultaneously delivering large thermal gradients, both cross-track and down-track, with little transition curvature (see FIGS. 2a and 2b comparing the recording patterns of a prior-art peg-based NFT in FIG. 2a to the present recording pattern in FIG. 2h), while requiring low optical power and low operating temperatures. The present design is a gap-based NFT as opposed to a peg-based NFT design, such as the design that was implemented using a Rh—Au bilayer NFT as provided by Headway Application. Further, the design achieves lower temperatures in modeling for two reasons: 1) it is more efficient at converting the optical energy from the waveguide mode into a confined near-field mode that is absorbed in the recording layer of the media, and 2) the smallest features of the design, i.e., the ridges, are more effective heat sinks than the smallest geometric feature, i.e., the peg, in peg-based designs such as is provided in Headway.

Gap-based NFT designs were previously proposed (e.g., in Headway Application) to improve transition curvature (see present FIG. 2b) relative to peg-based NFTs. While the down-track thermal gradient was maintained relative to peg-based designs, the cross-track thermal gradient dropped significantly (see col. 3 of Table 1 in FIG. 1). The reduction in cross-track thermal gradients is undesirable as it can lead to adjacent track erasure issues.

Previously proposed gap-based NFTs (e.g., HT16-021, see row 2 of Table 1 for comparisons) rely on a single metal ridge to provide low transition curvature at the expense of a low cross-track thermal gradient. The present disclosure provides a double-ridge (bottom ridge and top ridge) design structure to simultaneously produce low transition curvature at a significantly better cross-track thermal gradient than a single ridge design (see row 3 of Table 1). The down-track thermal gradient is also improved over any previous design. Some aspects of the present design borrow from design concepts outlined in previous disclosures, namely the single-ridge, gap-based NFT (HT16-021).

As shown in FIG. 3a, the first embodiment of the present disclosure provides an NFT that comprises a top ridge 150 and a bottom ridge 170 fabricated using thermo-mechanically stable material such as Rh, Ir or their alloys. The two ridges are separated by a dielectric gap 160 at the ABS of the device. Referring to FIG. 4a, there is shown that the top metal ridge 150 is extended rearward from the ABS and connected to a parabolic shaped metal layer 155. This layer is disposed adjacent to a dielectric waveguide core (i.e., a dielectric slot waveguide), 180 in FIG. 4c and to a gap layer 160 in FIG. 4b for first coupling the waveguide optical radiation to a surface plasmon mode and to then deliver a confined optical spot in the dielectric ridge gap to locally heat the medium for TAMR recording. The bottom ridge, 170 in FIG. 4c, is formed on a truncated upper surface of a sloped metal surface, hereinafter referred to as a waveguide blocker, that is positioned between the distal end of the waveguide core and the ABS to resonantly confine the light in the down-track direction. It is to be noted that the optical radiation from the waveguide that excites the surface plasmon mode must be polarized in a direction perpendicular to the NFT ridges (i.e., along the recording down-track direction). More precisely, device operation requires that the NFT be excited with the dielectric slot waveguide fundamental transverse magnetic mode, also known as either the fundamental TM mode or the $TM_{00}$ mode. It is worth pointing out that an "aperture" as will be used here refers to a dielectric filled opening in the ABS of an NFT design surrounded by an optically resonant metallic periphery. If the opening is surrounded by a material like Rh, which is optically resonant, then the opening itself becomes a resonant device and is termed an aperture. However, if the opening is surrounded by a material like Ru, which is not optically resonant, then the opening does not create a resonant device but is merely a device that blocks stray light by restricting the emergence of light except for that which passes through the opening. The opening shown in FIG. 3a is not surrounded by optically resonant materials as the two ridges are surrounded by dielectric materials 190 which are themselves not bordered by resonant materials.

Referring again to FIG. 1, there is shown a Table that displays key performance parameters of three NFT designs: a prior art peg-based NFT; a gap-based NFT (HT16-021); and a first embodiment of the presently disclosed double ridge gap-based NFT. The columns indicate that all three designs used a Rh based peg or ridge, but the presently disclosed device embodiment exhibited superior (or at least comparable) performance in providing a down-track and cross-track thermal gradient, a temperature increase of the peg/ridge and "bit integrity." Referring to FIGS. 2a and 2b, there is an illustration of recording patterns schematically showing the sequence of adjacent transitions in a recording medium on which the device is acting. FIG. 2a shows the patterns for a prior art peg-based NFT, FIG. 2b shows the patterns for the presently disclosed device. The patterns in FIG. 2b clearly show the reduced curvature. The "bit integrity" in col. 5 of the Table is a figure of merit inversely proportional to the curvature.

BRIEF DESCRIPTION OF THE DRAWINGS

FIG. 1 is a Table listing certain characteristics of three NFT designs.

FIGS. 2a and 2b are artists renderings of the recording patterns actually displayed by a prior art NFT (FIG. 2a) and the NFT of the present embodiment.

FIGS. 3a and 3b are, respectively, a schematic ABS view (x-y plane) and a schematic side cross-sectional view (y-z plane) of the NFT of a first embodiment of the present disclosure.

FIGS. 6a, 6b and 6c are a schematic ABS view (x-y plane), side cross-sectional view (y-z plane) and top-down horizontally planar (x-z plane) cross-sectional view of a second step in the fabrication of the top and bottom ridge of the NFT of FIG. 3a.

FIGS. 7a, 7b and 7c are a schematic ABS view (x-y plane), side cross-sectional view (y-z plane) and top-down horizontally planar (x-z plane) cross-sectional view of a third step in the fabrication of the top and bottom ridge of the NFT of FIG. 3a.

FIGS. 8a, 8b and 8c are a schematic ABS view (x-y plane), side cross-sectional view (y-z plane) and top-down horizontally planar (x-z plane) cross-sectional view of a fourth step in the fabrication of the top and bottom ridge of the NFT of FIG. 3a.

FIGS. 9a, 9b and 9c are a schematic ABS view (x-y plane), side cross-sectional view (y-z plane) and top-down horizontally planar (x-z plane) cross-sectional view of a fifth step in the fabrication of the top and bottom ridge of the NFT of FIG. 3a.

FIGS. 10a, 10b and 10c are a schematic ABS view (x-y plane), side cross-sectional view (y-z plane) and top-down horizontally planar (x-z plane) cross-sectional view of a sixth step in the fabrication of the top and bottom ridge of the NFT of FIG. 3a.

FIGS. 11a, 11b and 11c are a schematic ABS view (x-y plane), side cross-sectional view (y-z plane) and top-down horizontally planar (x-z plane) cross-sectional view of a final step in the fabrication of the top and bottom ridge of the NFT of FIG. 3a.

FIGS. 12a and 12b are, respectively, a schematic ABS view (x-y plane) and side cross-sectional view (y-z plane) of a second embodiment of a NFT showing its double-ridge structure.

FIGS. 14a, 14b, and 14c now schematically present 3-dimensional views of the device in FIGS. 12a and 12b, with 14a, being a schematic 3-dimensional rendering of the device with a perspective that includes a central-planar (y-z) view (a cross-track symmetry plane) and its intersection with the ABS plane (x-y). and with FIGS. 14b and 14c being insets showing partial views through horizontal plane (x-z) at two different levels that, in 14b expose the lower ridge structure and, in 14c, expose the upper ridge structure.

DETAILED DESCRIPTION

First Embodiment

Figure 4A:
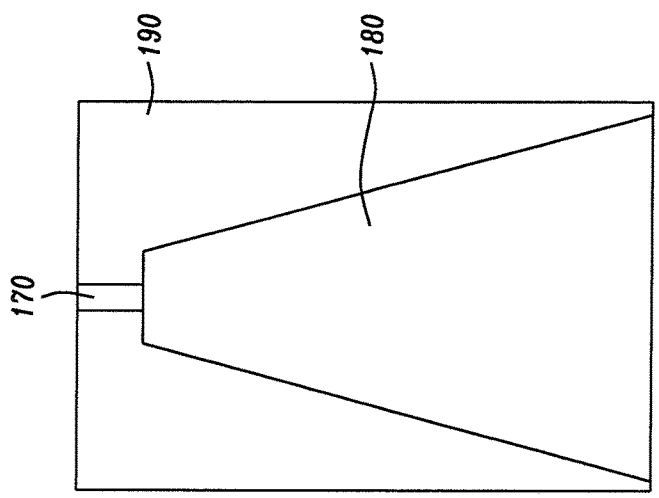
FIGS. 4a, 4b and 4c are schematic cross-sectional, top-down views in a horizontal (x-z) plane of the NFT of FIGS. 3a and 3b, where the cross-sections are taken along the dashed lines labeled A, B and C in FIG. 3b.

Below is a brief detailed description of the major characteristics of a first embodiment of the NFT proposed in the present invention. The description of the device structure is followed by a description of a method of its fabrication.
The Device
9) Referring to schematic FIG. 3a and FIG. 3b there is shown in FIG. 3a an ABS view (x-y plane) and in FIG. 3b a cross-sectional side view (y-z plane) of the present device. The side view of FIG. 3b shows three positions, A, B and C, through which horizontal slices will be taken and shown as FIGS. 4a, 4b and 4c, respectively. FIG. 3a shows a main magnetic pole 100 beneath which can be seen the double ridge device comprising an upper ridge 150, a lower ridge 170 and a dielectric filled gap 160 between them. Below the lower ridge there is seen the waveguide blocker, which in this design embodiment comprises two layers, an upper layer, which as FIG. 3b shows, is planar and truncated comprising 170 (the ridge) and 175 (a thinned region), both formed of Rh or Ir and a lower layer 200 of Au. However, the blocker may be formed as a single layer as well, having the same truncated geometrical shape as the two layer construction and having the same ridge 170 formed. FIG. 3b shows a main magnetic pole 100, beneath which is situated a waveguide 180 with a high index dielectric (e.g. TaOx) core (a dielectric slot-waveguide). Referring to schematic FIG. 4c, there is shown a top-down view of a horizontal planar (x-z plane) slice through FIG. 3b that is tapered in the down-track direction in the vicinity of the air bearing surface (ABS). The dielectric waveguide cladding (not shown) would comprise a low index dielectric such (e.g., SiOx or AlOx). FIG. 3b also shows a slice through a parabolic NFT resonator from which a rod 150 protrudes.

10) A waveguide blocker here shown comprising a thin upper layer 170 and a thicker lower layer 200. The upper layer is formed of Rh, Ir or their alloys, here formed as a ≥70 nm thick layer of these materials. Lower layer 200 is formed of a second material which may be Au or Au based alloy. This second layer of the waveguide blocker 200 has an extruded triangular shape along the x-direction and is located so that it's rear surface abuts the sloping distal end of the dielectric waveguide core (180 in FIG. 3b) and it's front surface is at the ABS. Note that the double layer blocker may also be formed as a single blocker formed of the Rh or Ir material and having the same geometrical shape as the double-layered blocker.

11) The top of the waveguide blocker at the ABS is flat and extending (in the x-direction) away from the ABS, ~50 nm into the head (see 170 in FIG. 3b) to comprise the bottom ridge.

12) A low index dielectric (e.g., AlOx) layer, 160 in FIG. 3b, situated atop the waveguide core 180 and the patterned top portion 170 of the waveguide blocker (ridge gap, 160, in FIG. 3a). This dielectric layer 160 has a thickness of 5-30 nm.

Figure 4B:
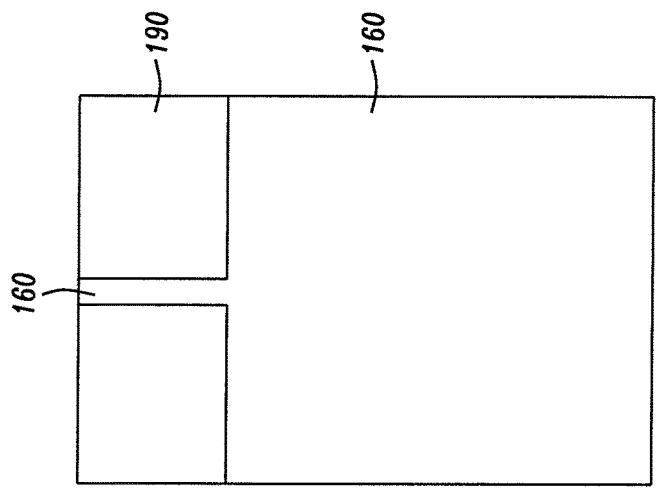
Figure 4C:
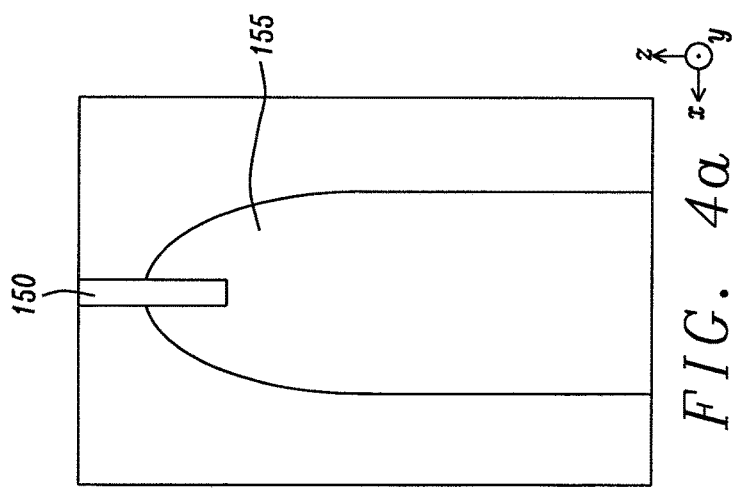

13) A rod, 150 in FIG. 4a, comprising Rh, Ir or their alloys, is located atop the low index dielectric layer 160. A part of the rod, 150 shown in FIG. 4a, is embedded in a parabolic shaped NFT resonator 155 formed of Au, Cu, Ag or a noble metal based alloy. This rod will form the top ridge of the double ridge structure.

14) As shown in FIG. 3a and FIG. 4a, the top of the waveguide blocker 170, the ridge gap 160 and the rod 150 are patterned in the cross-track direction so as to form a double-ridge structure that is ≤60 nm wide.

15) The region 190 on either side of the double-ridge structure is filled in with a low index dielectric material (e.g., SiO2). The refractive index of this material is lower than the refractive index of ridge gap 160 material.

16) In the cross-track direction, there is no optically resonant metal to form an aperture like shape.

Figure 5A:
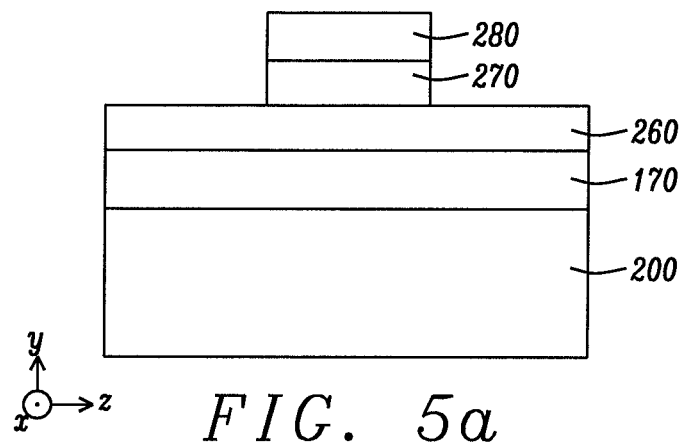
FIGS. 5a, 5b and 5c are a schematic ABS view (x-y plane), side cross-sectional view (y-z plane) and top-down horizontally planar (x-z plane) cross-sectional view of a first step in the fabrication of the top and bottom ridge of the NFT of FIG. 3a, where the step occurs immediately after the deposition of a waveguide blocker, a lower ridge layer and a gap dielectric layer.
Figure 5B:
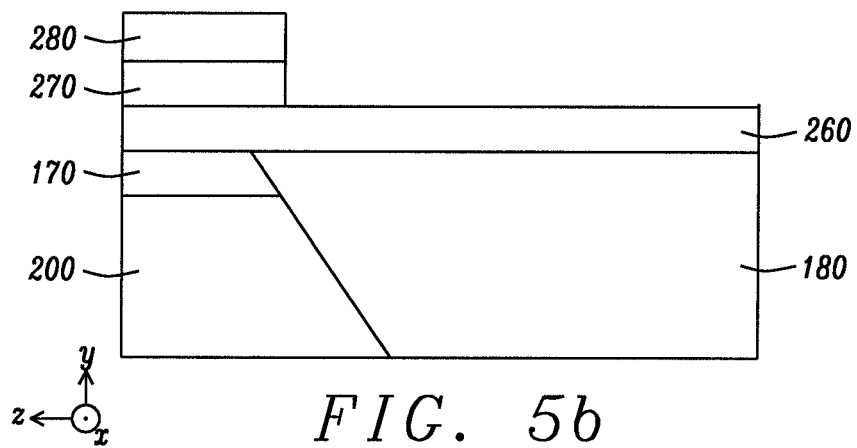
Figure 5C:
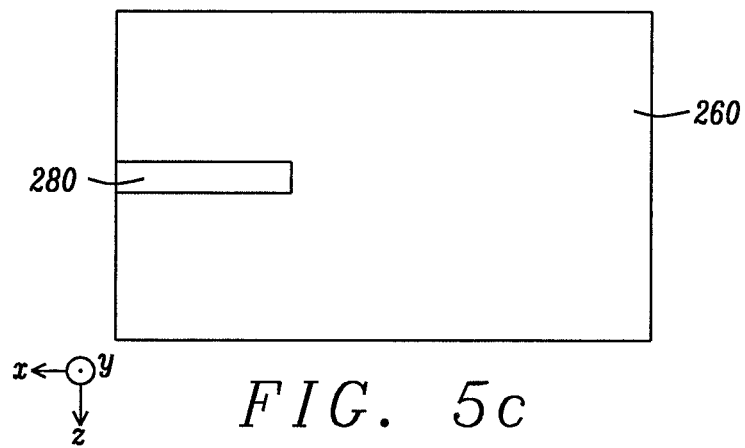

The Fabrication Method
The following describes the fabrication process for the NFT top ridge and bottom ridge as described above. The fabrication process is described and illustrated with respect to FIG. 5-FIG. 11:
8) Referring first to FIGS. 5a, 5b and 5c, showing ABS (x-y plane), side cross-sectional (y-z plane) and top-down (x-z plane) views respectively, we begin the fabrication process with a substrate comprising a partially fabricated head. Specifically, FIG. 5a is an ABS planar view of the substrate, where layer 200 is the ABS plane of an already formed first waveguide blocker of a first material such as Au, layer 170 is a second waveguide blocker layer of a second material such as Rh, layer 260 is a dielectric layer, typically of Al2O3, that will serve as a gap layer. On top of these three sequentially formed layers is a layer 270, formed of Rh or Ir, that will serve as an NFT rod and will form the top ridge of the double ridge structure. On top of this layer 270 is a mask layer 280 that will be used to pattern a bottom ridge through application of an etching process (IBE or RIE) that is applied to remove portions of the film not protected by the mask. Note that FIG. 5b is a side cross-sectional view that shows the already formed waveguide core 180 of TaOx extending rearward from the ABS and FIG. 5c is a top down horizontal view showing the dimensions of the mask 280 as it overlays the dielectric layer 260.

Figure 6A:
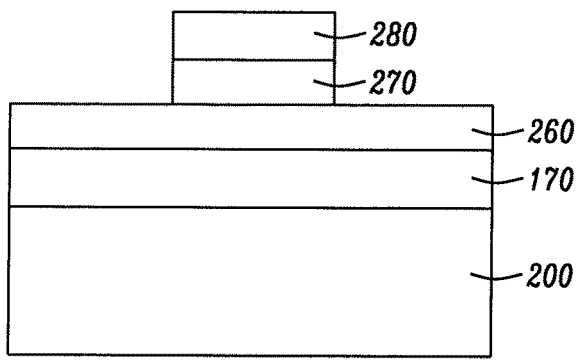
Figure 6B:
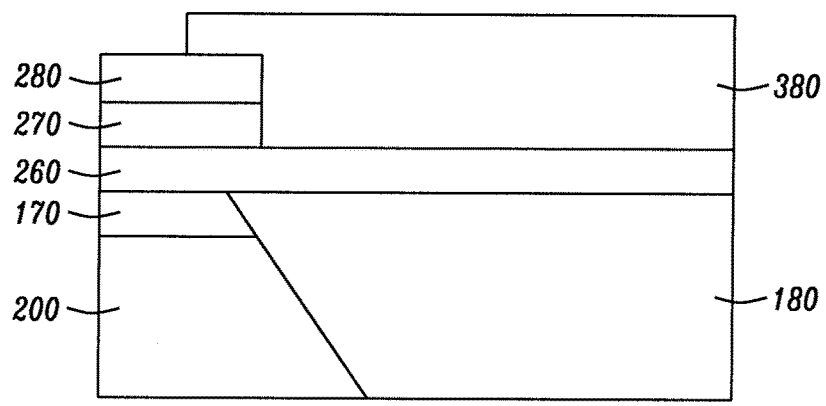
Figure 6C:
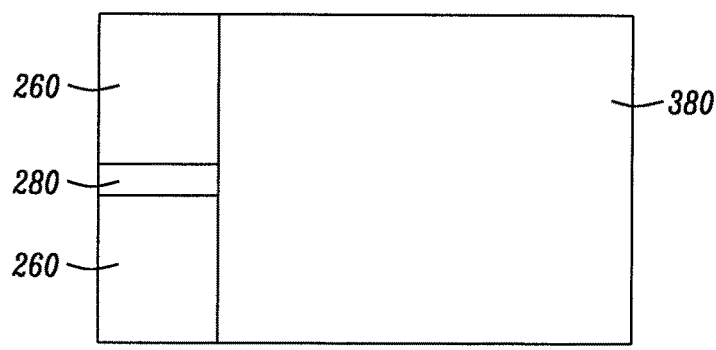

9) Referring next to FIGS. 6a, 6b and 6c, FIG. 6b shows the formation of photo-resistive mask layer 380 Photo resist (PR) is coated over part of the peg, with the resist front (distal) edge defining the bottom ridge length of the waveguide blocker, 170. FIG. 6c shows the extent of the PR mask 380.

Figure 7A:
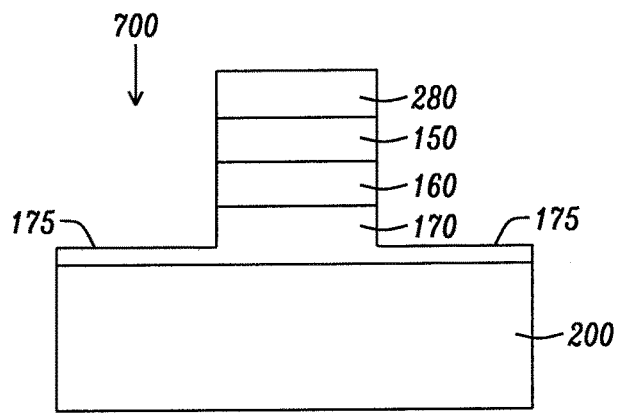
Figure 7B:
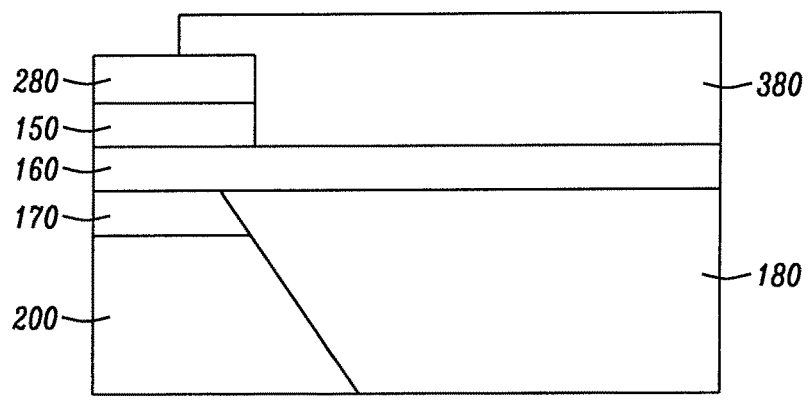
Figure 7C:
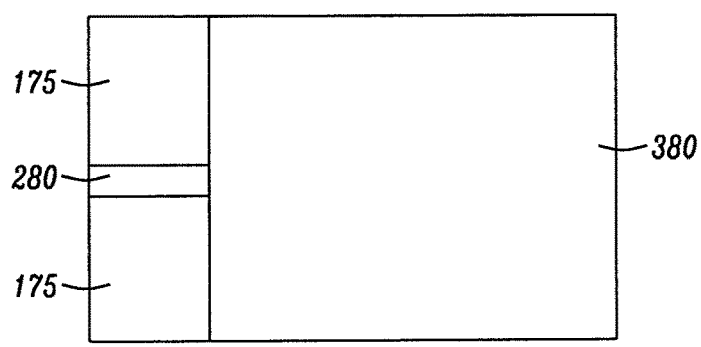

10) Referring next to FIG. 7a: an etching process 700 (IBE or RIE) is applied to completely remove horizontally extending portions of the gap dielectric 260 and to partially remove portions of the waveguide blocker 170 not protected by the mask, leaving a thinner layer 175 extending symmetrically to both sides of the central ridge 170 and the mask is subsequently stripped. FIG. 7c shows the remaining thinned portions 175 of the waveguide blocker.

Figure 8A:
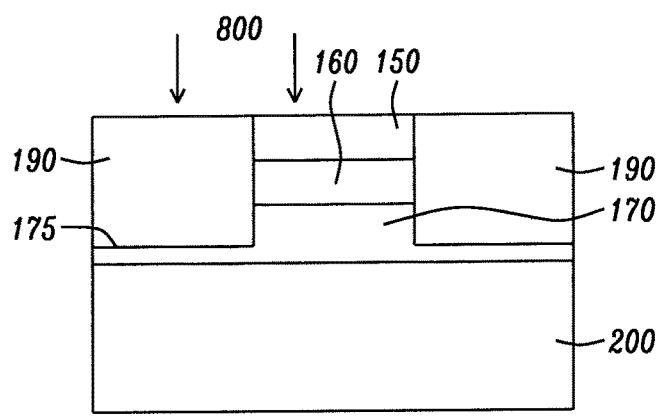
Figure 8B:
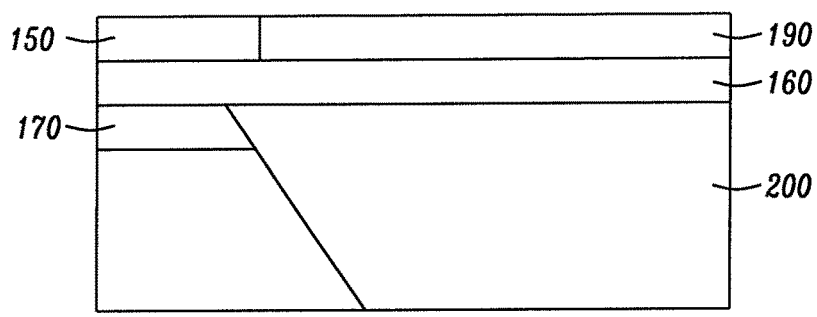
Figure 8C:
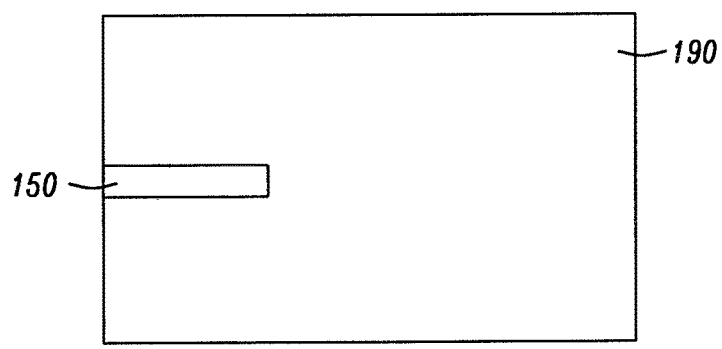

11) Referring to FIGS. 8a, 8b and 8c there is shown the next fabrication step: A PECVD (Plasma Enhanced Chemical Vapor Deposition) SiO2 deposition 190 is performed followed by a CMP planarization 800 to provide a final top ridge 150 thickness of 40±10 nm. FIG. 8c shows that the planarization has exposed the top ridge 150, now surrounded by the dielectric 190.

Figure 9A:
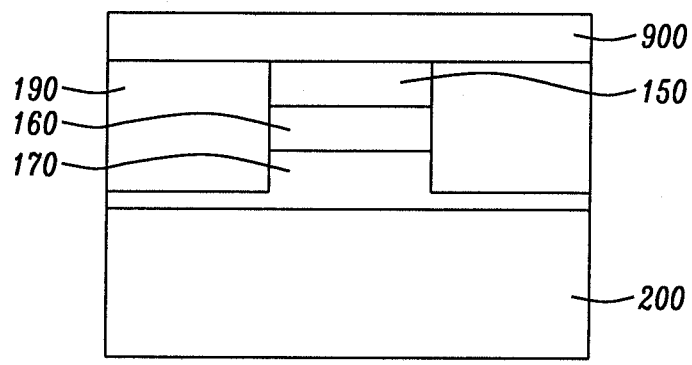
Figure 9B:
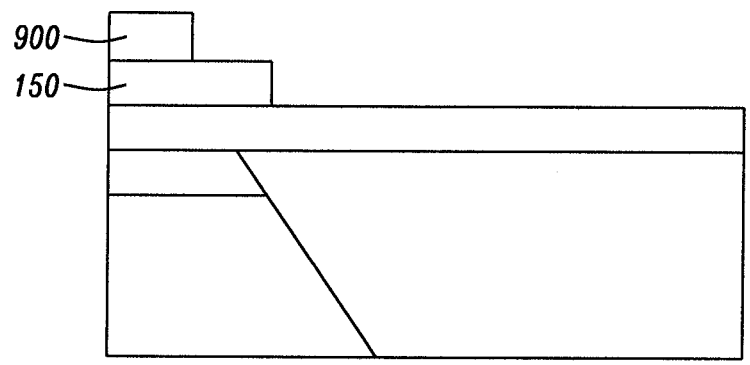
Figure 9C:
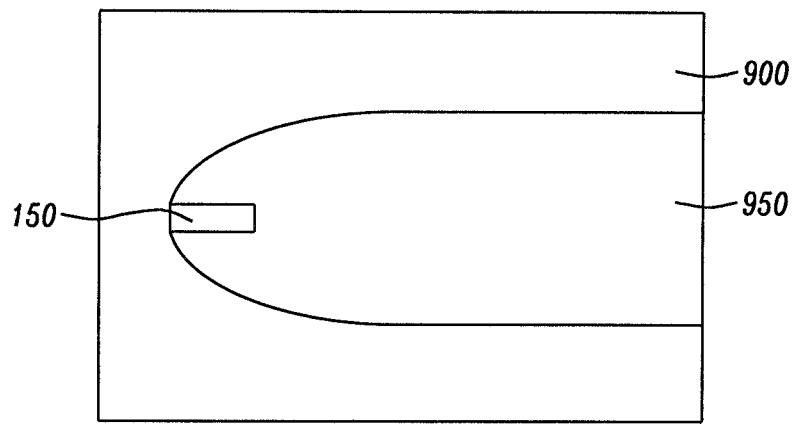

12) Referring to FIGS. 9a, 9b and 9c there is shown the next step in the fabrication process which is the fabrication of a NFT resonator, typically shaped as a parabola. To form the resonator a bi-layer photoresist mask 900 is used to create a NFT resonator body, which in this case has parabolic shape. As seen in FIG. 9a, the PR mask 900 lays atop the planarized surface 800 created in FIG. 8a. Then, RIE is applied to remove SiO2 (the region of the SiO2 to be removed is shown as 190 in FIG. 8b) inside of the parabolic shape of the body specified by the resist pattern. FIG. 9c shows the rod 150 entering the parabolic shaped opening 950 in the PR mask 900. Note that we refer at this point of the process to a "rod" being inserted, but ultimately the "rod", when incorporated into the patterned NFT, becomes the upper ridge. It is noted that the NFT described herein, when in its completed form, has only ridge-based features.

Figure 10A:
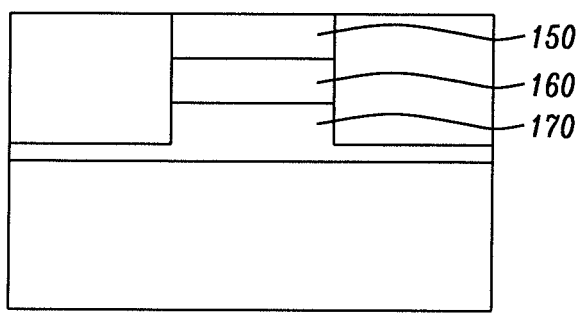
Figure 10B:
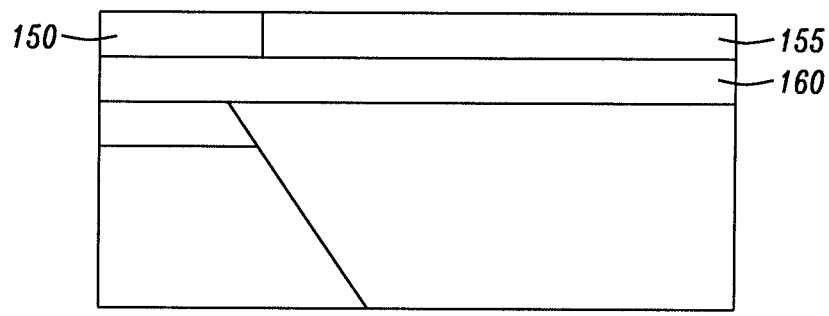
Figure 10C:
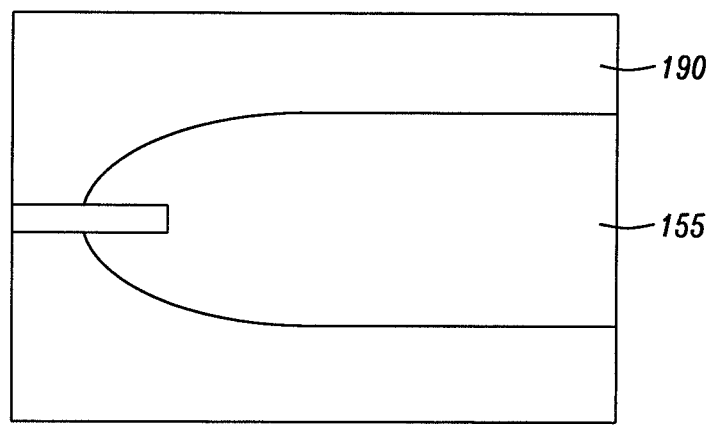

13) Referring to FIGS. 10a, 10b and 10c: FIGS. 10c and 10b show that an Au film 155 is deposited to fill the parabolic opening (950 in FIG. 9c) to form the body of the NFT resonator. This is followed by a chemical removal of the remaining PR mask and a CMP planarization to provide a final body thickness of the Au resonator of 40±10 nm.

Figure 11A:
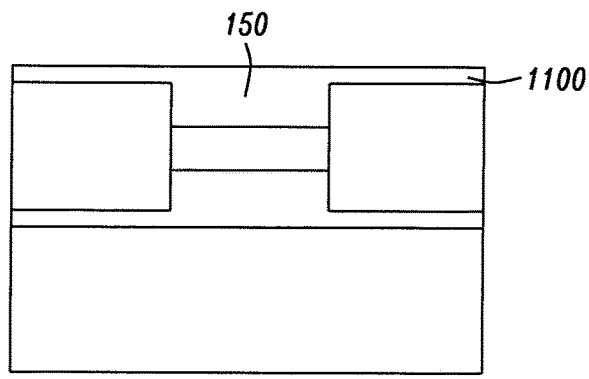
Figure 11B:
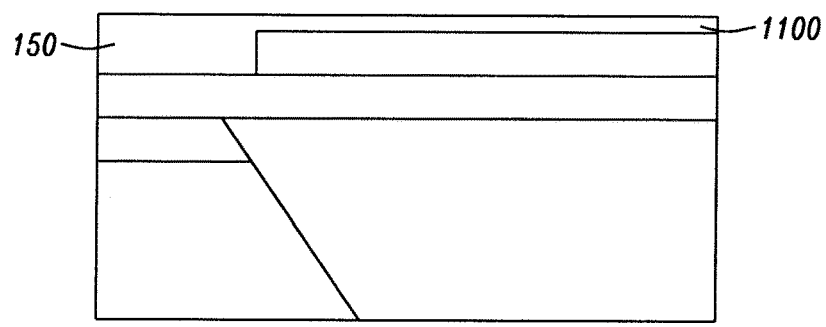
Figure 11C:
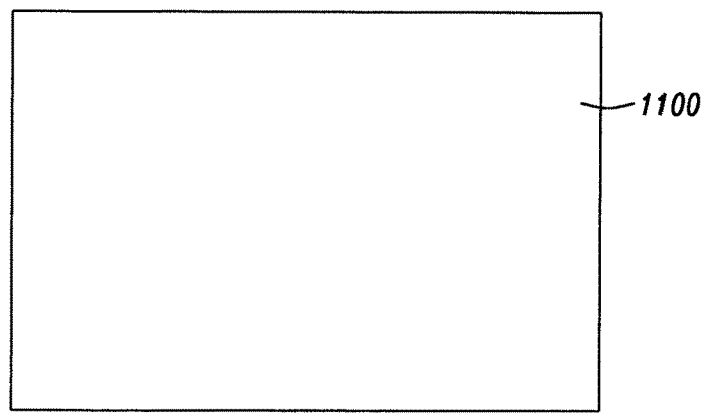

14) Referring finally to FIGS. 11a, 11b and 11c: A Rh diffusion barrier film 1100 is deposited on the rod 150 (turning its ABS portion into the top ridge of the double ridge structure) and the NFT resonator body, the film having a thickness of 15±10 nm. The complete coverage of this film is shown in FIG. 11c.

Second Embodiment

The second embodiment of the present NFT device also provides better transition curvature and larger down-track thermal gradient than current peg-based NFTs while also providing cross-track and down-track thermal gradients that are significantly better than those of other known low transition curvature NFT designs. The critical portion of the present NFT is entirely comprised of a thermo-mechanically stable metal (i.e., Rh), and enjoys a lower power requirement than previous NFT designs, some of which relied more heavily on Au, which has more favorable optical properties but is very thermo-mechanically unstable and easily deformed.

The temperature rise of the proposed NFT is expected to be on par with that of other recently proposed gap-based NFT designs, which in turn are expected to show lower temperature rise than current peg-based NFTs. It should be noted that the temperature reduction of gap-based NFT designs relative to their peg-based counterparts is in part due to the ability of gap-based designs to operate at track pitches smaller than the NFT ridge width (in gap-based designs a ridge replaces the peg as the critical NFT metal feature) whereas peg-based NFTs require a peg width that is smaller than the target track pitch. This is therefore an advantage that gap-based NFTs have over their peg-based counterparts.

Below, in association with FIGS. 12a, 12b, 13a, 13b, 13c, 14a, 14b and 14c is a brief but detailed description of this second embodiment of the present NFT. Following a general description of the device, we will focus on some of its major characteristics.

Referring first to FIG. 12a, there is shown an ABS planar (x-y plane) view of the device with x being the cross-track direction and y being the down-track direction. A main magnetic write pole 1000, typically of a ferromagnetic material, is surrounded laterally 1100 by a heat sink layer and beneath 1110 by a diffusion barrier layer 1100, typically of Ru. Beneath the pole and its surrounding layer 1100 there can be seen the ABS face 1800 of a waveguide blocker structure that is optically resonant and helps to confine the optical mode in the down-track (z) direction. Metallic side walls 1850 also serve to prevent unwanted radiation from striking the recording medium and also create an aperture by providing resonant metal features on either side of the double-ridge feature. This second embodiment, with a true aperture, can be considered as an optical analog of a microwave dual-ridge waveguide, whereas the first embodiment, does not have a true aperture because it lacks metal confinement on either side of the double-ridge structure. If one seeks an analogy of the first embodiment to a microwave system, it is to either a microwave microstrip waveguide or a parallel plate waveguide.

The opening in the ABS face is shaped by two ridges, a downward projecting upper ridge 1300 and an upward projecting lower ridge 1200. A narrow gap 1710 separates the ridges, the gap being filled by a dielectric material such as SiO2. Opposing grooves to each side of the ridges form symmetric openings 2000, which are filled with the same dielectric material SiO2. Additional Rh material extends 1210 to both sides of the grooves. It is noted that the grooves to either side of the lower ridge 1200 are formed by patterning the upper edge of the waveguide blocker 1800. The upper ridge 1300 is formed by a separate layer of Rh which is also patterned to form the symmetrically placed openings 2100 to either side of the upper ridge, that match the openings 2000 to either side of the lower ridge 1200.

Referring to FIG. 12b there is shown a side cross-sectional view (y-z plane) of the same device in FIG. 12a. In this view there can be seen elements that are hidden in the ABS view. A waveguide 1500 is formed of core dielectric material TaOx. The waveguide is beveled in the y-z plane and conformally abuts a complementary beveled edge of the waveguide blocker 1800 and is separated from the blocker by a dielectric layer 1900. A dielectric layer 1700 formed of SiO2 also covers the upper edge of the waveguide and projects 1710 over the top of the waveguide blocker into the ABS to fill the gap between the two ridges 1200 and 1300.

Figure 13A:
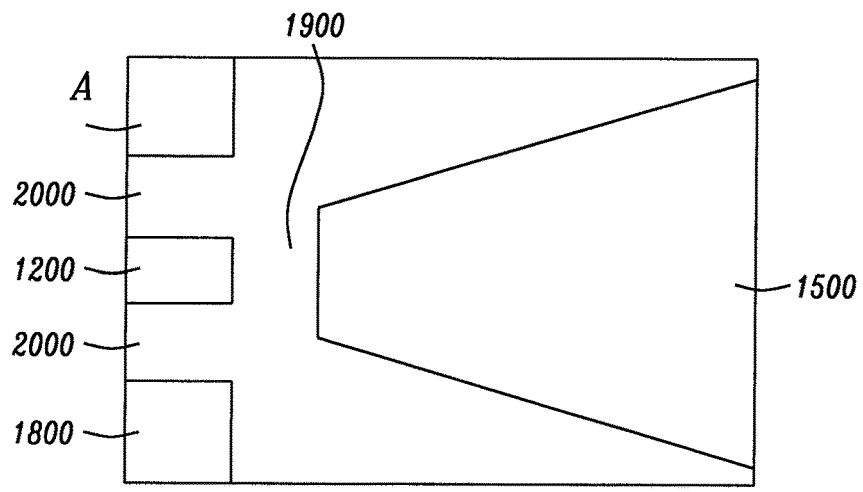
FIGS. 13a, 13b and 13c are schematic, top-down, cross-sectional views (x-z plane) of the second embodiment of the present disclosure. The cross-sections are taken at three levels denoted A, B and C in FIG. 12a above.

Referring next to FIG. 13*a*, there is seen an overhead view in the x-z plane of a cross-sectional slice of the device of FIG. 12*a* taken through the level denoted "A" in FIG. 12*a*. In this slice, which cuts through the lower ridge 1200, the dielectric filling the openings 2000 to each side of the ridge and the extreme lateral edges of the top of the waveguide blocker 1800, there can be seen the uniform x-y planar taper of the waveguide as it approaches the waveguide blocker 1800 in the z-direction. Note that the TaOx waveguide core 1500 is surrounded by dielectric SiO2 1900 that also serves as a cladding.

Figure 13B:
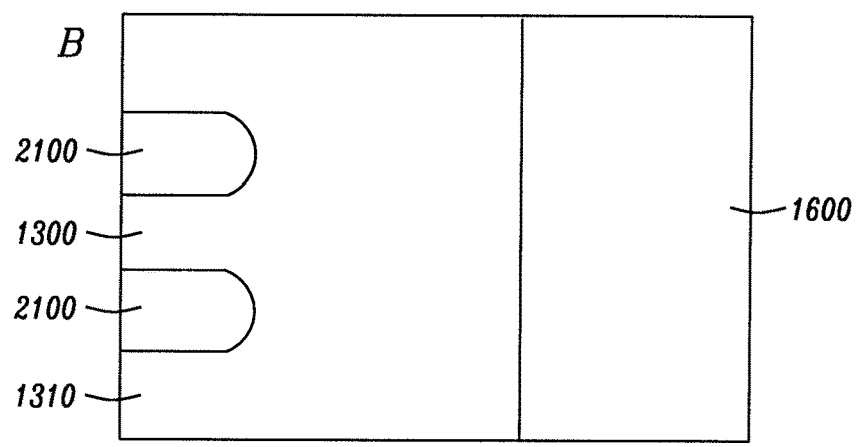

Referring next to FIG. 13*b*, there is seen an overhead view in the x-z plane of a cross-sectional slice of the device of FIG. 12*a* taken through the level denoted "B" in FIG. 12*a*. There is shown the patterning of Rh layer 1310 at the ABS that produces the upper ridge 1300 and the two identical, dielectric-filled grooves 2100 that flank the ridge symmetrically on each side. The elements 2100, 1300 and 2100 in FIG. 13*b* match the elements 2000, 1200 and 2000 in FIG. 13*a* to form the opening in the ABS face through which the plasmon near-field energy will couple to the recording medium. The Au layer 1600 that provides plasmons through excitation by the evanescent coupling of the fundamental transverse magnetic mode of the adjacent dielectric slot waveguide 1500 shown behind the layer 1310.

Figure 13C:
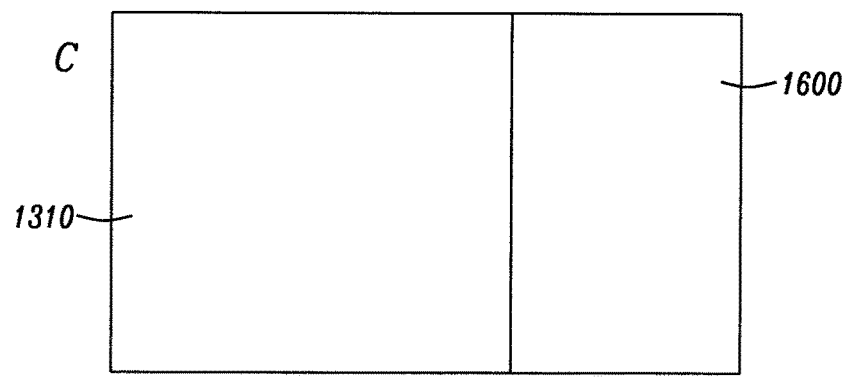

Referring next to FIG. 13*c*, there is shown the structure of the device of FIG. 12*a* along the slice denoted "C", which is above the patterned region of Rh layer 1310 from which the upper ridge 1300 was formed. Layer 1600 of Au is behind layer 1310.

Referring next to FIGS. 14*a*, 14*b* and 14 *c*, there is shown a, in 14 *a*, a schematic 3-dimensional rendering of the device of FIGS. 12*a* and *b*, with a perspective that includes a central-planar (y-z) view (a cross-track symmetry plane) and its intersection with the ABS plane (x-y). FIGS. 14*b*, and 14*c* show 3-dimensional drawings of 14*a*, with FIGS. 14*b* and 14*c* as insets showing partial views through horizontal plane (x-z) at two different levels that, in 14*b* expose the lower ridge structure and, in 14*c*, expose the upper ridge structure. Numeral identifiers are the same as used in the previous figures.

We will now describe some specific elements in the previous figures in greater detail, 12) A high index dielectric (e.g. TaOx) slot waveguide (1500 in FIG. 13*a*) that is tapered in the cross-track direction in the vicinity of the air bearing surface (ABS). The waveguide cladding 1900 comprising a low index dielectric (e.g., SiOx or AlOx).

13) A waveguide blocker (1800 in FIG. 12*b*) either entirely comprising Rh or comprising a ≥70 nm layer of Rh atop a second material which may be either metal or dielectric. The waveguide blocker having an extruded triangular shape (see the beveled face in FIG. 12*b*) and being located between the dielectric waveguide core and the ABS. Note, our use of the term dielectric slot waveguide refers to a waveguide comprising a dielectric core material with rectangular cross-section surrounded by a cladding material. The finite rectangular cross-section provides two-dimensional confinement of the optical mode. The term "slot" typically differentiates this type of waveguide from "planar" waveguides which provide confinement only in one direction.

14) The top of the waveguide blocker at the ABS being flat and extending ~50 nm into the head (in the −z direction).

15) The top of the waveguide blocker being patterned in the cross-track direction so as to have a ridge (1200 in FIG. 12*b*) that is 560 nm wide with grooves (2000 in FIG. 12*a*) on either side so that the total width of the ridge and the two grooves combined is ~200 nm. The grooves being filled in with a low index dielectric material (e.g., SiO2) (see 2000 in FIG. 13*a*).

16) A low index dielectric (e.g., SiOx) spacer (1900 in FIG. 12*b*), 30-50 nm in thickness at a 45 angle to the ABS, disposed between the waveguide core and the sloped edge of the waveguide blocker.

17) A low index dielectric (e.g., SiOx) layer (1700 in FIG. 12*b*) situated atop the waveguide core and extending (see 1710 in FIG. 12*b*) over the patterned top portion of the waveguide blocker. This dielectric layer having a thickness of 5-30 nm.

18) A first Rh film ~10-30 nm in thickness (1300 in 12*b*) that extends ≥150 nm into the head from the ABS. This film having two rectangular portions removed from it so as to leave a ~80 nm long ridge with a groove on either side. The grooves being filled in with a low index material (e.g. SiO2). The ridge and grooves being aligned in the cross-track direction with those situated at the top of the waveguide blocker as described in (4).

19) A second Rh film of thickness ~10-30 nm located atop the one described in (7), and extending approximately the same distance from the ABS into the head as the film described in (7). This second Rh film is not patterned with any grooves.

20) Yet a third Rh film 1210 joining the top of the Rh waveguide blocker described in (3-4) and the Rh film described in (7). The third Rh film is broken into two parts that only exist (in the cross-track direction) beyond the oxide-filled (e.g., SiO2) grooves described in (4) and (7). The present Rh film is thus located in the same layer as the dielectric film 1710 described in (6), and so it partially replaces the aforementioned dielectric in that layer. The present Rh film structure constitutes the aperture side walls 1850 in FIG. 12*a*.

21) An Au film (1600 in FIG. 12*b*) of thickness ~80 nm that begins at the back of the films (1310 in FIG. 12*b*) describe in (7-8) and extends into the head a further ~1000 nm. This film is situated atop the dielectric film described in (6) and provides plasmon energy by coupling to the electromagnetic mode in the adjacent waveguide 1500.

22) A film of thickness ~10 nm, 1110 comprising a thermo-mechanically stable material (e.g., Ru) situated atop the Rh and Au films described in (7-9), said film acting as a diffusion barrier between the NFT structure described in (1-10) and a main pole structure to be fabricated atop it.

Revisions and modifications may be made to methods, materials, structures and dimensions employed in forming and providing embodiments of a TAMR magnetic write head having a near-field transducer (NFT) that focuses optical power on a small region of a magnetic recording medium, while still forming and providing embodiments of such a device and its method of formation in accord with the spirit and scope of the present disclosure as defined by the appended claims.

The invention claimed is:

1. TAMR (Thermally Assisted Magnetic Recording) head utilizing a Near-Field Transducer (NFT) to provide plasmon near-field energy comprising:
   a magnetic writer structure having a main write pole emerging at a distal ABS (Air-Bearing Surface) and configured to write on a magnetic recording medium when said magnetic recording medium is properly activated thermally by plasmon near-field energy;
   and a gap-based NFT structure adjacent to said main write pole and commonly sharing said ABS and comprising a cross-track ABS configuration of two vertically aligned and opposing ridges, the ridges being a downward projecting upper ridge and an upward projecting lower ridge, said ridges being separated by a dielectric-filled gap and laterally bounded by a dielectric material, wherein
   said near-field transducer emerges at said ABS configuration and provides said near-field energy whereby said recording medium is thermally activated and writing occurs.

2. The TAMR write head of claim 1 wherein said NFT further comprises:
   a waveguide, having a dielectric waveguide core horizontally tapered in an x-z plane, formed adjacent to and aligned along said write pole in a z-direction and configured for directing optical energy towards said ABS, a distal end of said waveguide being beveled with a downward angle relative to said x-z plane; and
   a waveguide blocker, formed as a single layer or as an upper layer formed on a lower layer, said waveguide blocker having a beveled proximal end conformally abutting said beveled distal end of said waveguide, wherein said waveguide blocker extends along the x-axis with an approximately uniform truncated triangular cross-section in the y-z plane and wherein said upper layer is truncated and forms a patterned planar surface extending along the x-axis parallel to the x-z plane, wherein said patterning creates said upward projecting lower ridge; and
   a first dielectric gap layer formed on a top surface of said waveguide and extending over said truncated portion of said waveguide blocker and emerging at said ABS where it fills a gap between said upper and lower ridges;
   a plasmonic metallic layer, having a flat parabolic shape in the x-z plane, formed on said dielectric gap layer, a distal end of said parabola terminating at a distance away from said ABS, said parabolic layer being surrounded by a second dielectric layer;
   a metallic rod extending in a −z direction away from said ABS and projecting partially into the vertex of said parabola, wherein a distal end of said rod extends to said ABS whereat said rod forms said downward projecting upper ridge;
   a metallic layer forming a diffusion barrier layer formed beneath said main pole and covering said rod and said parabolic plasmonic layer;
   said second dielectric layer filling all spaces produced by patterning and said second dielectric layer emerging at said ABS to contact both sides of said upper and lower ridges and said gap layer between said ridges.

3. The TAMR writer of claim 2, wherein said tapered waveguide core is formed of the high index dielectric TaOx and said first dielectric gap layer also serves as waveguide cladding and is formed of a low index dielectric chosen from SiO2 or Al2O3.

4. The TAMR writer of claim 2, wherein said waveguide blocker is formed of an upper layer and a lower layer and wherein said upper layer is formed of Rh, Ir or their alloys, of thickness ≥70 nm and wherein said lower layer is formed of Au or its alloys and wherein said waveguide blocker extends along the x-direction and has a uniform triangular cross-section with a planar truncated top in the y-z plane.

5. The TAMR write head of claim 4 wherein said planar truncated top of said waveguide blocker extends a distance of approximately 50 nm in the −z direction away from said ABS.

6. The TAMR write head of claim 2 wherein said lower ridge patterned into said waveguide blocker is ≤60 nm in width.

7. The TAMR write head of claim 6 wherein said first dielectric layer is a layer of the low index dielectric Al2O3 or the low index dielectric SiO2 and is formed to a thickness of between 5-30 nm.

8. The TAMR write head of claim 2 wherein said truncated portion of said waveguide blocker extends approximately 50 nm from the ABS in a −z direction.

9. The TAMR write head of claim 2 wherein said parabolic layer is a highly conductive layer of Au, Cu or Ag or their alloys.

10. The TAMR write head of claim 2 wherein said diffusion barrier layer is a layer of Rh.

11. The TAMR write head of claim 2 wherein said conformally abutting beveled ends of said waveguide and said waveguide blocker are separated by a uniformly thick layer of low index dielectric chosen from SiO2 or AlOx.

12. A method of forming a TAMR write head, comprising:
   providing a substrate including a first waveguide blocker layer; and
   a second waveguide blocker layer formed on said first waveguide blocker layer; and
   a waveguide formed abutting a proximal end of said waveguide blocker along a sloped interface; and
   a first dielectric layer uniformly covering a coplanar upper surface of said first waveguide blocker layer and said waveguide; then
   forming a top ridge layer on said first dielectric layer; then
   forming a first mask layer on said top ridge layer; then
   patterning said top ridge layer to form a top ridge; wherein said layers all terminate distally to form a coplanar ABS.

13. The method of claim 12 further comprising:
   forming a photo-resist mask layer partially over said first mask and completely over said first dielectric layer, a distal edge of said photo-resist mask being recessed from said ABS; then
   etching away, using an IBE (ion-beam etch) or RIE (reactive ion etch), lateral sides of said first dielectric layer and, partially, said first waveguide blocker layer, thereby forming a bottom ridge on said first waveguide blocker layer that is of identical width as said upper ridge; then
   stripping away said first mask.

14. The method of claim 13 further comprising:
   using a PECVD (plasma chemical vapor deposition), depositing a second dielectric layer to fill in openings to either side of said upper and lower ridges and to cover exposed surface of said first dielectric layer; then
   using a CMP (chemical mechanical polishing) planarization, reducing the thickness of said upper ridge to 40+/−10 nm.

15. The method of claim 14 further comprising:
   using a bi-layer photo-resist mask, form outline of a parabolic NFT resonator body shape; then using a RIE, remove exposed region of said first dielectric layer within said outline, thereby creating said parabolic NFY resonator shape within said photo-resist mask; then deposit a layer of Au, Cu or Ag to fill said removed parabolic region and to encase said upper ridge; then using a CMP planarization process, reduce body thickness of said parabolic body to 40+/−10 nm, corresponding to thickness of said upper ridge; then deposit a diffusion barrier layer over said planarized surface to prevent inter-diffusion of body material into a subsequently formed magnetic pole.

16. A TAMR (Thermally Assisted Magnetic Recording) head utilizing a Near-Field Transducer (NFT) to provide plasmon near-field energy comprising:

a magnetic writer structure having a main write pole emerging at a distal ABS (Air-Bearing Surface) and configured to write on a magnetic recording medium when said magnetic recording medium is properly activated thermally by plasmon near-field energy;

and a gap-based NFT structure adjacent to said main write pole and commonly sharing said ABS and comprising a gap-based NFT structure having an ABS configuration in which an opening is formed comprising two vertically aligned and opposing ridges, the ridges being a downward projecting upper ridge and an upward projecting lower ridge, said ridges being separated vertically by a dielectric-filled gap and laterally surrounded by vertically aligned, symmetrically placed dielectric-filled grooves, wherein said near-field transducer emerges at said opening and provides said near-field energy whereby said recording medium is thermally activated and writing occurs.

17. The TAMR write head of claim 16 wherein said NFT further comprises:

a waveguide, having a horizontally (an x-z plane) tapered dielectric waveguide core, formed adjacent to and aligned along (z-direction) said write pole and configured for directing optical energy towards said ABS, a distal end of said waveguide being beveled with a downward angle relative to said x-z plane; and a waveguide blocker conformally abutting said beveled distal end of said waveguide, a dielectric layer uniformly separating said abutting edges, wherein said waveguide blocker extends along the x-axis with a uniform truncated triangular cross-section in the y-z plane and wherein said truncated portion forms a patterned planar surface extending along the x-axis parallel to the x-z plane; and a plasmonic metallic layer formed between said waveguide and said main pole and separated from said main pole by a diffusion barrier layer and separated from said waveguide and from said patterned truncated vertex of said waveguide blocker by a dielectric cladding layer that extends to said ABS and emerges between said upper and said lower ridges; wherein a distal end of said plasmonic metallic film abuts a proximal end of a metallic layer that extends distally to emerge at said ABS wherein it forms said upper ridge and is flanked on each side by a dielectric filled groove; and wherein a lower ridge is formed in said patterned truncated vertex of said waveguide blocker, a proximal end of said lower ridge conformally abutting said beveled distal end of said waveguide and wherein said lower ridge is flanked on each side by a groove that is aligned with the corresponding grooves alongside said upper ridge; and wherein each of said pair of aligned grooves is flanked by a resonant side wall that is formed on an upper truncated face of said waveguide blocker whereby said ridges are enclosed within an aperture.

18. The TAMR writer of claim 17, wherein said tapered waveguide core is formed of the high index dielectric TaOx and said waveguide cladding is formed of a low index dielectric chosen from SiO2 or AlOx.

19. The TAMR writer of claim 17, wherein said waveguide blocker is formed either entirely of Rh or is formed as a layer of Rh, of thickness ≥70 nm formed on a second material which may be either a metal or a dielectric.

20. The TAMR write head of claim 17 wherein said planar truncated top of said waveguide blocker extends a distance of approximately 50 nm in the −z direction from said ABS.

21. The TAMR write head of claim 17 wherein said lower ridge patterned into said waveguide blocker is ≤60 nm in width and said grooves laterally disposed to either side of said ridge each have an identical width such that the combined width of said ridge and said two grooves is approximately 200 nm.

22. The TAMR write head of claim 21 wherein said grooves are filled with the low index dielectric SiO2.

23. The TAMR write head of claim 17 wherein said dielectric layer between said waveguide blocker and said waveguide core is formed of a layer of SiOx having a thickness between approximately 30-50 nm, said layer having a refractive index less than that of said core.

24. The TAMR write head of claim 17 wherein said layer of dielectric cladding material extending over said waveguide core material and extending over said patterned surface of said waveguide blocker is SiOx having a thickness of between 5-30 nm.

25. The TAMR write head of claim 17 wherein said patterned upper ridge is a Rh layer between approximately 10-30 nm in thickness that extends ≥150 nm in the −z direction away from said ABS.

26. The TAMR write head of claim 17 wherein said resonant side walls form triangular prisms or trapezoidal prisms, said prisms having a first face that is coplanar with said ABS plane and a second face that extends rearward from said first face.

27. The TAMR write head of claim 17 wherein said plasmonic layer is a layer of Au of thickness approximately 80 nm that extends from the proximal end of said patterned top layer for a distance of approximately 1000 nm.

28. The TAMR write head of claim 17 wherein said diffusion barrier layer is a layer of the thermo-mechanically stable material Ru and it is situated between said magnetic pole and said abutting layers of Au and Rh.

29. The TAMR write head of claim 17 wherein said ridges and said grooves are of identical dimensions.

* * * * *